United States Patent Office 3,155,711
Patented Nov. 3, 1964

3,155,711
BIS(ALKOXY ALKYL PHOSPHINYL-DICHLORO-METHYL) AND BIS(ALKOXY PHENYLPHOS-PHINYL-DICHLOROMETHYL) SULFONES
Karoly Szabo, Pleasantville, N.Y., assignor to Stauffer Chemical Company, New York, N.Y., a corporation of Delaware
No Drawing. Filed Dec. 18, 1962, Ser. No. 245,400
4 Claims. (Cl. 260—461)

This invention is concerned with novel organophosphorus compounds and a method of preparing them. The invention is particularly concerned with bis chlorinated sulfones characterized by the presence of organophosphorus residues.

The novel class of organophosphorus compounds contemplated herein can be depicted by the following structure:

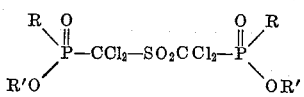

wherein R and R' refer to lower alkyl radicals as exemplified by methyl, ethyl, isopropyl, isobutyl, n-butyl, sec.-butyl, and the like, and aromatic hydrocarbon radicals of the benzene and naphthalene series such as phenyl, lower alkylphenyl, e.g. methylphenyl, ethylphenyl, etc., chlorophenyl, α-naphthyl, β-naphthyl and the like. Specific structures falling within the ambit of the general formula include the following:

Compound 1

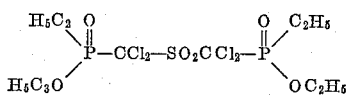

Compound 2

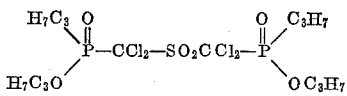

Compound 3

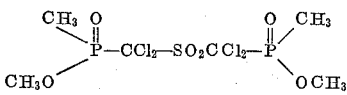

Compound 4

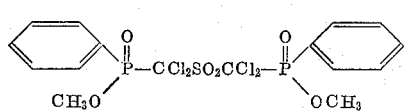

Compound 5

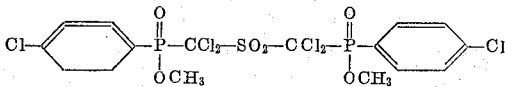

Compound 6

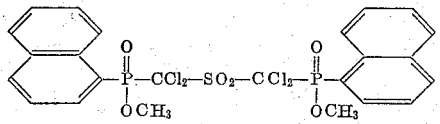

As can be seen from an inspection of the formulae, including both the generic and specific configurations, the compounds of the present invention are unusual in that they embody two important chemical functions, to wit, a phosphino radical on the one hand and a sulfone residue on the other. These double function compounds, aside from being new and novel, are useful and valuable because of their high degree of biocidal activity. For instance, they exhibit a high degree of toxicity toward various pest organisms falling within the lower order of classification, and in this connection reference is made to American cockroach (*Periplaneta americana*, Linn.), milkweed bug (*Oncopeltus fasciatus*, Dallas), confused flour beetle (*Tribolium confusum*, Duval), house fly (*Musca domestica*, Linn.) and the two-spotted mite (*Tetranychus telarius*, Linn.).

The compounds of the invention can be realized by condensing an organic ester of a phosphonous acid, e.g. a lower trialkylphosphonite or dialkylarylphosphonite with bis (trichloromethyl) sulfone in the presence of a relatively inert, normally liquid organic solvent. In general, I have ascertained that excellent results ensue when the phosphonite ester is added to the sulfone in the presence of a liquid aromatic solvent such as benzene, toluene, xylene, or mixtures thereof. The reaction tends to be exothermic and in some instances, external cooling of the reaction vessel may be necessary. The compounds are isolated as thick heavy oils after removing the volatile components of the reaction mixture. The following equation illustrates the reaction:

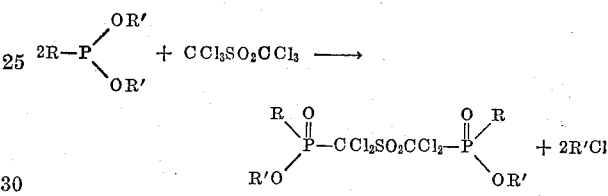

wherein R and R' have the values previously enumerated.

Reference is now made to the following examples which are presented for the purpose of illustration only since variations in practicing the invention without departing from the spirit or scope thereof will be apparent to those skilled in the art to which the said invention pertains.

*Example 1*

Bis (ethyl ethylphosphinodichloromethyl) sulfone

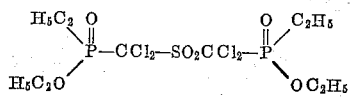

A solution consisting of 30.0 g. of diethylethylphosphonite and 20 ml. of benzene was added rapidly in four portions to a solution containing a molar excess of bis (trichloromethyl) sulfone in 60 ml. of benzene. Immediately following addition of the first portion, an exothermic reaction ensued and the temperature of the mixture rose to 94° C. accompanied by vigorous refluxing; external cooling was required. The reaction is preferably maintained at about 70° C. The remaining portions of the phosphonite ester resulted in only mild evolution of heat, although some external cooling was necessary for proper control. After all of the phosphonite ester had been introduced, the reaction mixture was subjected to distillation to remove the solvent and any excess volatile components. The product was isolated in the form of a residual, slightly yellow oil which weighed 45 g. The $N_D^{25}$ amounted to 1.4855. Analytical data was in consonance with the above depicted structure.

*Example 2*

Bis (methyl methylphosphonodichloromethyl) sulfone

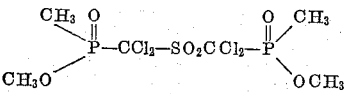

The procedure of Example 1 was again carried out but in this case dimethyl methylphosphonite was used in lieu of the corresponding triethyl ester. In general, the results and yields paralleled those obtained in the case of the first example.

*Example 3*

Bis (methyl phenylphosphonodichloromethyl) sulfone

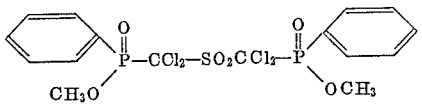

Using the procedure as above given, 17.0 g. (0.1 mole) of dimethylphenylphosphonite was gradually added to a mixture of 15.05 g. (0.05 mole) of bis (trichloromethyl) sulfone. In general, the results and yield were in consonance with those of the previous examples. The product was isolated by distilling off the volatile components. After decolorization using activated charcoal, the resulting nearly colorless oil had a $N_D^{25}$ of 1.5445.

I claim:

1. An organophosphorus compound of the following formula:

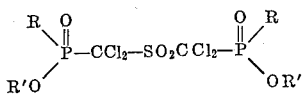

wherein R' represents lower alkyl and R is selected from the class consisting of lower alkyl and phenyl.

2. The organophosphorus compound of the formula:

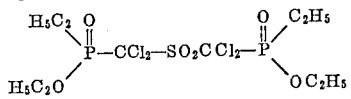

3. The organophosphorus compound of the formula:

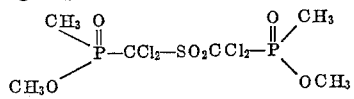

4. The organophosphorus compound of the formula:

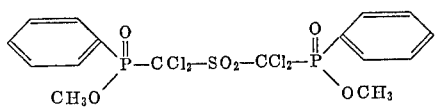

References Cited in the file of this patent

UNITED STATES PATENTS 2,642,461    Morris et al. _____ June 16, 1953

OTHER REFERENCES

Kosolapoff: "Organo-Phosphorus Compounds," John Wiley and Sons, New York, N.Y. (1950), pp. 120, 121.